United States Patent Office 3,626,758
Patented Dec. 14, 1971

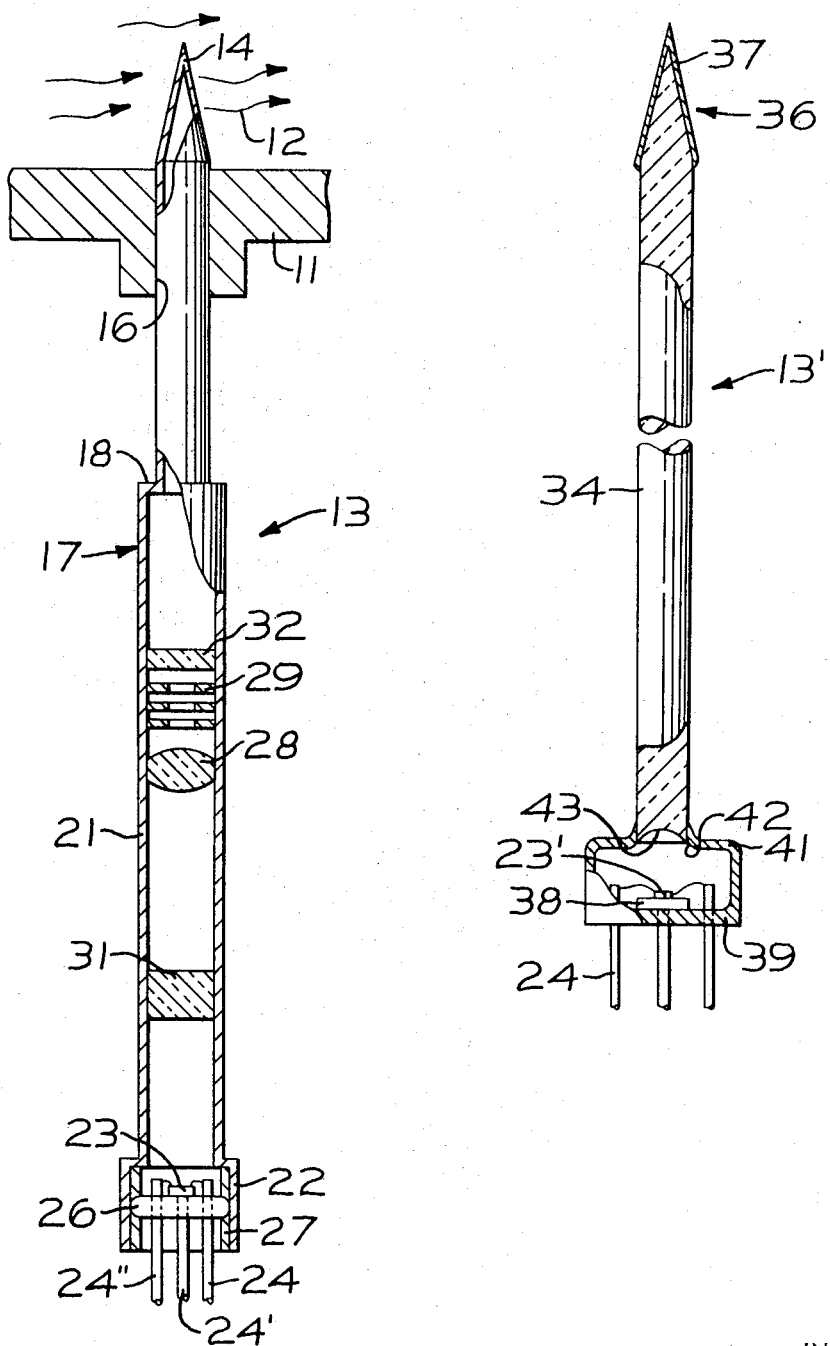

3,626,758
REMOTE RADIATION TEMPERATURE SENSOR
James E. Stewart, Lafayette, La., and Duane E. Evans and Gerald L. Larson, Peoria, Ill., assignors to Caterpillar Tractor Co., Peoria, Ill.
Filed Dec. 15, 1969, Ser. No. 885,069
Int. Cl. G01j 5/08
U.S. Cl. 73—355 R                    2 Claims

ABSTRACT OF THE DISCLOSURE

A semiconductor element of the kind which produces an electrical signal which is a function of the intensity of incident infrared radiation is disposed at one end of a thin tubular body having a tip at the opposite end which may be disposed in a high temperature environment. The tip has a conical configuration to approximate blackbody characteristics and emits thermal radiation towards the detector through a system of collimators and lenses within the tube. In another embodiment, the body of the device may be a solid quartz or sapphire rod having a conical radiation opaque tip at one end and having a concave opposite end to define a focusing lens for directing infrared radiation onto the detector element.

BACKGROUND OF THE INVENTION

This invention relates to temperature detection apparatus and more particularly to apparatus for producing an electrical signal indicative of temperature changes in a particular region.

Pyrometric instruments for obtaining temperature readings and systems which are automatically controlled in response to temperature changes often require a sensor device capable of producing an electrical signal indicative of temperature at a particular localized region. An example of the latter kind of system is described in copending application Ser. No. 777,278 of Duane E. Evans filed Nov. 20, 1968 for Dual Clutch Free Turbine Engine, assigned to the assignee of this application, and now abandoned. This co-pending application discloses a gas turbine engine control system in which various control functions such as the rate of fuel input are regulated automatically in response to temperature signals from certain points in the engine.

Commercially available temperature probes of the kind discussed above are typically based on either thermocouples or temperature sensitive variable resistors. In both cases, the useful life of such devices is undesirably small where the device is exposed to a high temperature environment such as the turbine engine application discussed above. Such devices must be made of certain specific materials to obtain the desired thermoelectric properties and these materials in general are not those which can be exposed to high temperatures in a corrosive environment for protracted periods without deterioration. Accordingly, frequent replacement of the device is necessary, typically after 1,000 to 9,000 hours of use in an environment such as that discussed above.

Radiation pyrometers are still a third general class of thermoelectric transducer and have the advantage of being capable of producing an electrical temperature signal without requiring disposition of the thermosensitive element in the high temperature region. These devices are simply focused on the high temperature region along an optical line of sight and have an element of the kind which produces an electrical signal proportional to the intensity of thermoradiation, from the region. As heretofore constructed, radiation pyrometers are "window" devices in that the thermosensitive element is situated outside the high temperature region and simply views the region through a radiation transparent element of some kind. Insofar as useful life is concerned, such instruments are not severely limited by direct thermal damage under this condition. However, an equivalent limitation is present in that most high temperature environments rapidly cloud and obscure the transparent window which is necessary for proper operation of a radiation pyrometer. Probably for this reason, it has not heretofore been apparent that radiation pyrometry techniques would have any advantage for applications of the kind discussed above.

SUMMARY OF THE INVENTION

This invention provides a compact simple temperature sensor of the kind which may be penetrated into a high temperature region and which exhibits a much longer useful life than has heretofore been characteristic of related devices. The invention comprises a tubular body, one end of which may be disposed within a high temperature region and which has a conical tip which is opaque to thermal radiation as such. However, the inner surface of the tip acts as a thermal radiation generator and functions approximately as a blackbody source for a radiation sensitive element at the opposite end of the tube with means being provided therein for collimating and focusing the radiation from the inner surface of the tip. Thus, the long life of radiation pyrometric systems is embodied in a compact integral probe which does not require a radiation transparent window.

Accordingly, it is an object of this invention to provide a more durable device for producing an electrical signal indicative of temperature changes within a high temperature region.

The invention together with further objects and advantages thereof will best be understood by reference to the following description of preferred embodiments in conjunction with the accompanying drawings.

BRIEF DESCRIPTION OF THE DRAWINGS

In the drawings:
FIG. 1 is a view, partially in axial section, of a temperature sensor device for producing an electrical signal in accordance with the objects of the invention, and
FIG. 2 is a view of a second embodiment of the invention with portions thereof in axial section.

DESCRIPTION OF PREFERRED EMBODIMENTS

Referring now to the drawing and more particularly to FIG. 1, there is shown a portion of a conduit 11 carrying a hot gaseous fluid flow indicated schematically by arrows 12 wherein it may be necessary to generate an electrical signal which varies as a function of changes in the temperature of the flow 12. Conduit 11 may, for example, be the casing of a gas turbine engine of the kind disclosed in the above identified co-pending application Ser. No. 777,278 wherein a temperature signal is utilized for regulating the input of fuel to the engine in an automatic fashion. As hereinbefore described, thermocouple elements or heat sensitive variable resistive elements deteriorate rapidly if disposed within an environment such as the flow 12. Similarly, conventional radiation pyrometers rapidly become unreliable in that the transparent window or lens which protects the radiation sensitive element from the flow 12 rapidly becomes clouded. These effects are avoided and long life temperature sensing is effected in the present invention by use of a sensor device 13 having a tip end 14 which extends a short distance into flow 12, the probe 13 being transpierced through a suitable bore 16 in the wall of conduit 11.

Sensor 13 has a narrow tubular body 17 with a step 18 whereby the tip end 14 and adjacent portions of the body are of less diameter than the portion 21 which is remote from the tip. The end 22 most remote from tip 14 is of still greater diameter to receive an infrared radiation sensitive element 23 as will hereinafter be described in more detail.

Tip 14 functions as a radiation source which emits infrared radiation through body 17 to detector element 23 with the intensity of the emitted radiation being a function of the temperature of the tip. Thus, if the sensor 13 is to function efficiently, tip 14 must be formed of a material which is quickly responsive to changes of the temperature af gas flow 12 and does not deteriorate in the environment of the flow and the inner surface of the tip should exhibit high emissivity. For these purposes, the tip 14 is preferably thin and formed of a metallic material of high thermal conductivity. The tip material should be thermally stable and corrosion resistant in the high temperature environment. Under the conditions of the present example, the tip 14 may advantageously be formed of the predominantly nickel and molybdenum alloy known as Hastelloy.

To maximize emissivity whereby the tip 14 approximates a blackbody radiator, the tip is formed with a conical configuration wherein at least the interior walls of the tip form an angle of about 10 degrees with respect to the axis of the tubular body 17. Simulation of blackbody behavior in a conical radiator of this kind is dependent upon multiple internal reflection of radiation within the cone in a manner analogous to the design of artificial blackbody receivers as is known in the calometric art. Accordingly, it is important that the inner surface of tip 14 be polished and that it stay in this condition. This is assured in the present invention in that the tubular body 17 is sealed as will hereinafter be described and at least the portions thereof proximal to tip 14 are preferably evacuated.

The radiation sensitive detector element 23 may be any of the known solid state devices for this purpose. A typical detector of this kind, sensitive primarily to the infrared wave lengths, is a treated silicon chip having three terminal pins 24 connected thereto. In one known form of such detector, a DC bias voltage is applied across a first pair of the leads 24 including a ground lead 24' and a signal voltage appears across the third lead 24'', with reference to the ground lead 24', with the magnitude of the signal being a function of the magnitude of the infrared radiation impinging on the sensitive surface of the detector element 23. Methods for producing such radiant energy sensitive semiconductor elements 23 and suitable power supply circuitry and signal output circuitry for connection with leads 24 are known to the art and accordingly will not be further described. The detector element 23 is mounted on a circular support 26 through which the lead wires 24 may be transpierced. In this embodiment of the invention, support 26 is disposed coaxially within the enlarged lower end 22 of sensor body 17 and is retained therein by an annuli 27 secured within the end of the probe.

Accordingly, with appropriate electrical connections to leads 24, detector element 23 will generate an output signal indicative of the temperature of the inner surface of tip 14 and thus indicative of the temperature of the flow 12. To maximize the magnitude of the output signal, a lens 28 may be disposed coaxially within tubular body 17 between tip 14 and detector element 23 to focus radiant energy from the tip on the sensitive surface of the element. To maximize accuracy of the output signal, one or more apertured irises 29 may be disposed coaxially in the tube body 17 to collimate the energy radiating through the tube whereby the element 23 sees only those rays which arrive directly from the inner surface of tip 14. Some forms of detector element 23 are sensitive to wave lengths which are outside the infrared range and which may introduce error into the output signal if received at the detector. Where these forms of detector 23 are employed, it may be desirable to dispose an appropriate band pass filter element 31 within the tube body 17.

Considering still further provisions for enhancing accuracy and durability of the sensor 13, it is desirable that the tubular body 17 be sealed and evacuated. The presence of a gaseous atmosphere within the probe may produce some minor deterioration of optical surfaces and may also tend to adsorb radiant energy in a non-uniform manner. As complete evacuation of the probe 13 greatly increases manufacturing cost where elements such as irises 29, lens 28 and filter 31 are situated therein, considerable advantages can be gained by situating a transverse seal element 32 within the tubular body 17 between such elements and tip 14, the seal being formed of a material transparent to the wave lengths of radiant energy which are relied upon for activation of detector element 23. With this arrangement a sizable portion of the sensor 13 proximal to tip 14 may be evacuated and sealed off by element 32 without creating severe manufacturing complications.

In operation, the sensor 13 is highly durable in that the radiation sensitive detector element 23 is remote from the high temperature flow region 12 and is situated where cooling provisions may readily be made should they be needed. Very importantly, none of the elements of the system which must be transparent to radiant energy are exposed to the high temperature gas flow 12 and thus there is no significant clouding or obscuring of such elements after extended use. The apparatus is thus extremely long lived as well as being simple, economical and accurate.

Other means may be provided for transmitting radiant energy from a radiation opaque blackbody simulating tip to a remote detector element in accordance with the invention.

Referring now to FIG. 2, there is shown a second embodiment of the invention wherein the radiant energy transmitting body of the sensor 13' is a solid rod 34 formed of a material transparent to the infrared or other appropriate band of radiant energy for activating the detector element 23'. Quartz or sapphire are suitable heat resistant materials for this purpose. The tip end 36 of sensor 13', which is inserted into the high temperature region, is again formed with a conical configuration wherein the sides of the cone form about a 10 degree angle with respect to the axis of rod 34. Preferably a metallic layer 37 is deposited on the conical tip 36 by vacuum deposition for example. The tip 36 thus again functions effectively as a blackbody radiator with the radiant energy therefrom being conducted along rod 34 to the detector element 23' which is situated a small distance from the opposite end of the rod along the axis thereof. Detector element 23' and a suitable support 38 may be secured to an end wall 39 of a hollow cylindrical capsule 41 having an aperture 42 which fits onto the end of rod 34 and is bonded thereto, the leads 24 of the detector element 23' being transpierced through capsule end wall 39. To maximize the magnitude of the signal from detector element 23', the end surface 43 or rod 34 adjacent the detector may be made concave with an appropriate curvature whereby it functions as a lens to focus a radiant image of tip 36 on the sensitive area of detector element 23'.

What is claimed is:
1. A temperature sensor comprising:
   an elongate body having a tip end for insertion into a region wherein temperature is to be detected and having a remote end and a radiant energy transmission path between said ends.
   a radiant energy sensitive detector element disposed at said remote end of said body at said path for producing an electrical signal which varies as a function of the magnitude of radiant energy transmitted along said path,
   a tip element disposed at said tip end of said body and having an inner surface exposed to said path for radiating energy therealong, said tip element being opaque to said radiant energy whereby said signal is determined by energy which is transmitted through said tip element by thermal conduction and radiated from said inner surface thereof along said path, wherein said tip element has a conical configuration, and wherein said inner surface of the conical tip element forms an angle of about 10 degrees with respect to said transmission path to cause multiple internal reflections of radiation within said tip element to provide black body behavior.

2. A temperature sensor comprising:

an elongate body having a tip end for insertion into a region wherein temperature is to be detected and having a remote end and a radiant energy transmission path between said ends, said body being a solid rod of radiant energy conductive material, a radiant energy sensitive detector element disposed at said remote end of said body at said path for producing an electrical signal which varies as a function of the magnitude of radiant energy transmitted along said path, and a tip element disposed at said tip end of said body and having an inner surface exposed to said path for radiating energy therealong, said tip element being opaque to said radiant energy whereby said signal is determined by energy which is transmitted through said tip element by thermal conduction and radiated from said inner surface thereof along said path, wherein said detector element is spaced from the remote end of said rod and wherein said remote end surface of said rod is curved to form a lens focusing energy from said inner surface of said tip element on said detector element.

References Cited
UNITED STATES PATENTS

| | | | |
|---|---|---|---|
| 1,318,516 | 10/1919 | Wallis et al. | 73—355 R |
| 1,475,365 | 11/1923 | Schueler et al. | 73—355 X |
| 1,639,534 | 8/1927 | Ruben | 73—355 X |
| 2,709,367 | 5/1955 | Bohnet | 73—355 |
| 3,051,035 | 8/1962 | Root | 73—355 X |
| 3,269,255 | 8/1966 | Shaw | 356—43 X |
| 3,287,956 | 11/1966 | Dreyfus et al. | 73—1 F |
| 3,309,881 | 3/1967 | Beerman | 73—1 F X |
| 3,452,598 | 7/1969 | Jones | 73—355 |

LOUIS R. PRINCE, Primary Examiner

F. SHOON, Assistant Examiner

U.S. Cl. X.R.

356—44